A. HANSEN.
PAN HANDLE.
APPLICATION FILED JUNE 10, 1910.
978,741.
Patented Dec. 13, 1910.
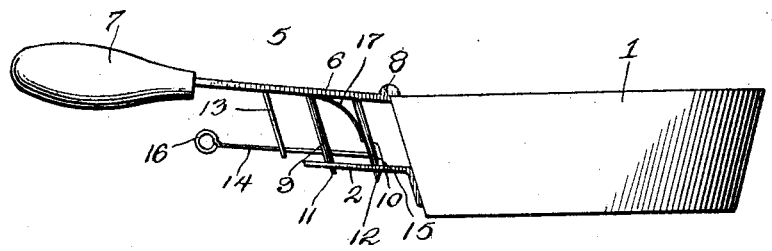
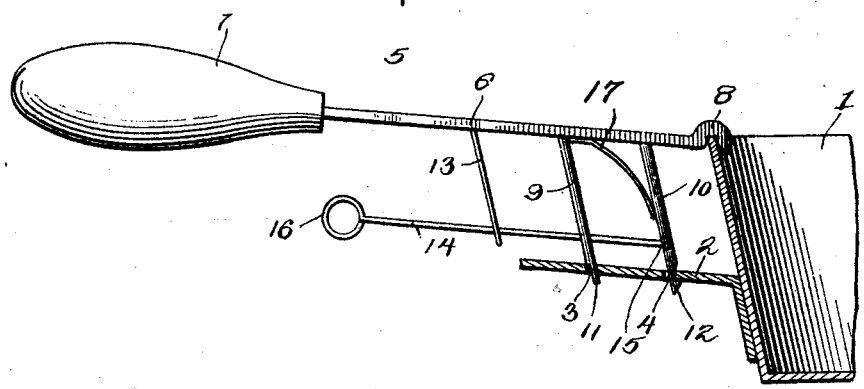
Inventor
Alfred Hansen.
Witnesses
W. S. McDowell
By Victor J. Evans
Attorney

UNITED STATES PATENT OFFICE.

ALFRED HANSEN, OF GOTHAM, WISCONSIN.

PAN-HANDLE.

978,741.   Specification of Letters Patent.   Patented Dec. 13, 1910.

Application filed June 10, 1910. Serial No. 566,230.

*To all whom it may concern:*

Be it known that I, ALFRED HANSEN, a citizen of the United States, residing at Gotham, in the county of Richland and State of Wisconsin, have invented new and useful Improvements in Pan - Handles, of which the following is a specification.

This invention relates to cooking utensils, and more particularly to that class having detachable handles.

The primary object of the invention is to provide a cooking utensil having a stub handle and a handle proper which may be securely attached to the stub handle but which may be easily and quickly withdrawn therefrom when desired, so as to provide a " cool " handle for removing the utensil from the fire when desired.

With the above, and other objects in view, which will appear as the description progresses, the invention resides in the novel construction and combination of parts hereinafter fully described and claimed.

In the accompanying drawings is illustrated a simple and preferred embodiment of the improvement, and in which drawings, Figure 1 is a side elevation of a cooking utensil provided with the improved handle. Fig. 2 is a side elevation, part of the pan being shown in section.

In the accompanying drawings the numeral 1 designates a cooking utensil, which in the present instance, is in the form of an ordinary frying pan, but it is to be understood that I do not desire to limit myself to any particular structure of said utensils. The pan 1 is provided with what may be termed a stub handle 2. This stub handle 2 is secured to the pan 1 adjacent its base, and has its stem or projecting portion provided with a pair of openings 3 and 4. These openings 3 and 4 are preferably located in the center of the stem and are positioned a suitable distance apart.

In ordinary uses, when the pan is not being heated upon a stove or the like, the stub handle 2 may be used as means for hanging the pan in a cupboard or the like, as it will be readily apparent that either of the openings 3 or 4 may be adapted for the reception of a nail, hook or other sustaining device.

The numeral 5 designates the improved removable handle. This handle 5 comprises a longitudinally extending bar 6 having one of its ends provided with a handle proper, designated by the numeral 7 and its opposite end provided with a hook 8. The bar is further provided with preferably an integral depending arm 9 and spring catch 10. Both the finger 9 and the catch 10 have their lower extremities provided with incut portions forming lips 11 and 12. The bar 6 is further provided with a depending guide 13, the same being adapted for the reception of an operating rod 14. This rod 14 is adapted to pass through a suitable opening provided within the finger 9 and to be loosely engaged with the catch 10. The opposite end of the operating rod is provided with a finger hold or loop 16, whereby the catch member 12 may be readily and quickly drawn toward the handle 7 when it is desired to remove the member 5 from the stub handle 2, in a manner hereinafter to be set forth.

The numeral 17 designates a flattened spring or resilient member which is connected with the under face of the bar 6 and contacts the catch member 10 so as to normally force the same away from the finger 11.

In attaching the handle 5 to the receptacle 1, the hook 8 is first positioned upon the edge of the said receptacle directly above the stub handle 2. The finger 9 has its lip 11 engaged within the cut away portion 3 of the said stub handle. The operating rod 14 is manipulated so as to bring the catch member 10 into position to engage within the opening 4 under the pressure of the spring 17. By this arrangement, it will be noted that the receptacle or pan 1 is firmly grasped and may be easily removed from the stove without danger of injuring the hand of the operator.

Having thus fully described the invention, what I claim as new is:—

1. The combination with a cooking utensil having a stub handle provided with spaced openings, of a detachable handle, said handle having one of its ends provided with a hook adapted to engage the edge of the utensil, and the handle being further provided with members adapted to engage within the openings of the stub handle and to exert a pressure in opposite directions to each other.

2. In combination with a cooking utensil having a stub handle provided with a pair of spaced openings, a detachable handle, said detachable handle having one of its extremities provided with a hook adapted to engage the edge of the utensil, the handle being further provided with members adapted to engage within the openings of the stub handle and to exert a pressure in opposite directions to each other, and means provided upon the handle and connected with one of the members to draw the said member toward the second member.

3. In combination with a cooking utensil having a stub handle provided with a pair of spaced openings, a removable handle for the utensil, said removable handle having one of its ends provided with a hook adapted to engage the edge of the utensil, the handle being further provided with members adapted to engage within the openings of the stub handle, a spring exerting pressure upon one of the members to force the same away from the second member, the first member being provided with a longitudinally extending rod connected thereto, substantially as and for the purpose set forth.

4. In combination with a cooking utensil having a stub handle, said handle being provided with a pair of spaced openings, of a removable handle for the utensil, said removable handle having one of its ends provided with a hook adapted to engage the edge of the utensil, a catch member secured to the under face of the hook, a spring normally contacting this catch, a depending finger arranged in spaced relation to the catch member and secured to the handle, a guide member upon the handle, an operating rod passing through the guide member and connecting the catch, substantially as and for the purpose set forth.

5. In combination with a utensil having a stub handle positioned adjacent the bottom thereof, said stub handle being provided with a pair of spaced openings, a removable handle for the utensil, said removable handle having one of its ends provided with a hook adapted to engage the upper edge of the utensil, a catch depending from the handle and having its lower extremity provided with a lip, the handle with the lip adapted to engage one of the openings in the stub handle, a finger upon the handle engaging the second opening of the stub handle, a guide upon the handle, an operating rod passing through the guide and connected with the catch, and a spring member for normally forcing the lip of the catch against the lower face of the stub handle.

In testimony whereof I affix my signature in presence of two witnesses.

ALFRED HANSEN.

Witnesses:
MARTIN SIMONSON,
G. MOORE.